(12) United States Patent  
Bellinetto et al.

(10) Patent No.: US 8,443,527 B2
(45) Date of Patent: May 21, 2013

(54) FABRIC TEMPERATURE ESTIMATION FOR A LAUNDRY DRYER

(75) Inventors: Enrico Bellinetto, Azzate (IT); Davide Colombo, Gerenzano (IT); Paolo Crosta, Gavirate (IT); Federico Visconti, Monza (IT)

(73) Assignee: Whirlpool Corporation, Benton Harbor, MI (US)

( * ) Notice: Subject to any disclaimer, the term of this patent is extended or adjusted under 35 U.S.C. 154(b) by 594 days.

(21) Appl. No.: 12/641,709

(22) Filed: Dec. 18, 2009

(65) Prior Publication Data

US 2011/0146102 A1   Jun. 23, 2011

(51) Int. Cl.
- F26B 3/34 (2006.01)
- F26B 5/08 (2006.01)
- F26B 3/00 (2006.01)
- F26B 19/00 (2006.01)

(52) U.S. Cl.
USPC ............ 34/269; 34/327; 34/445; 34/89

(58) Field of Classification Search
USPC ............ 34/132, 549, 572, 269, 327, 445, 34/89
See application file for complete search history.

(56) References Cited

U.S. PATENT DOCUMENTS

| | | | |
|---|---|---|---|
| 4,485,566 A | 12/1984 | Vivares | |
| 5,291,667 A | 3/1994 | Joslin et al. | |
| 5,682,684 A * | 11/1997 | Wentzlaff et al. | 34/495 |
| 6,401,357 B1 * | 6/2002 | Smith et al. | 34/260 |
| 6,987,395 B2 | 1/2006 | Yang et al. | |
| 2006/0101587 A1 | 5/2006 | Hong | |
| 2008/0092403 A1 | 4/2008 | Bae et al. | |
| 2009/0223082 A1 | 9/2009 | Baek et al. | |

FOREIGN PATENT DOCUMENTS

| | | |
|---|---|---|
| DE | 4336350 A1 | 4/1995 |
| DE | 4442250 A1 | 5/1996 |
| DE | 10134971 A1 | 2/2003 |
| EP | 2034086 A1 | 3/2009 |
| EP | 2080832 A1 | 7/2009 |
| WO | 2007059858 A1 | 5/2007 |
| WO | 2008017565 A1 | 2/2008 |

OTHER PUBLICATIONS

German Search Report for DE102010036938, Mar. 5, 2012.

* cited by examiner

*Primary Examiner* — Kenneth B Rinehart
*Assistant Examiner* — John McCormack
(74) *Attorney, Agent, or Firm* — Clifton G. Green; McGarry Bair PC

(57) ABSTRACT

A method for estimating the temperature of a laundry load in a treating chamber of a laundry dryer.

8 Claims, 8 Drawing Sheets

FABRIC TEMPERATURE ESTIMATION FOR A LAUNDRY DRYER

BACKGROUND OF THE INVENTION

A laundry treating appliance, such as a clothes dryer, typically has a configuration based on a rotating drum that defines a treating chamber in which laundry items are placed for treatment. The clothes dryer may have a controller that implements a number of pre-programmed cycles of operation to remove moisture from the laundry items by the application of heat, typically through a heated air flow. The laundry items may be damaged by the application of excess heat during a cycle of operation if the temperature and/or moisture level of the laundry items increases above a predetermined threshold. In addition, the application of excess heat may be energy inefficient and result in an operating cycle that is longer than necessary.

SUMMARY OF THE INVENTION

A method for estimating the temperature of a laundry load in a treating chamber of a laundry dryer, with the treating chamber having an air inlet and an air outlet, comprises determining an inflow temperature value indicative of the temperature of air entering the treating chamber, determining an outflow temperature value indicative of the temperature of air exiting the treating chamber and determining a load amount value indicative of the amount of the laundry load in the treating chamber. A laundry temperature value indicative of the laundry load temperature may be determined based on the inflow temperature, the outflow temperature and the load amount value.

DESCRIPTION OF EMBODIMENTS OF THE INVENTION

Figure 1:
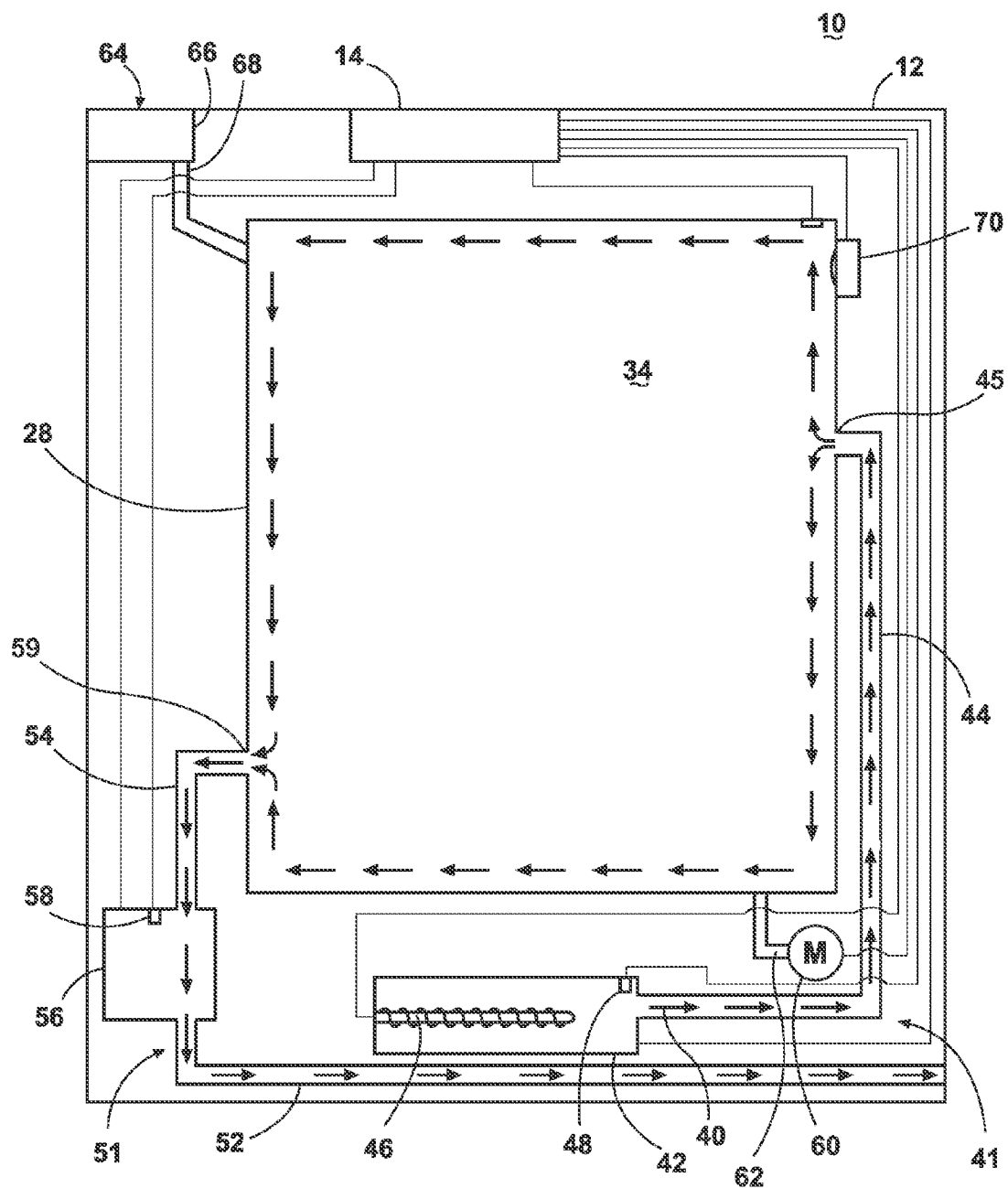
FIG. 1 is a schematic view of a laundry treating appliance according to an embodiment of the invention.

FIG. 1 illustrates one embodiment of a laundry treating appliance 10 in the form of a clothes dryer according to the invention. While the laundry treating appliance 10 is illustrated as a clothes dryer, the laundry treating appliance 10 according to the invention may be any appliance which performs a cycle of operation on laundry, non-limiting examples of which include a horizontal or vertical axis clothes dryer; a air vented dryer; a condenser dryer; a combination washing machine and dryer; a tumbling or stationary refreshing/revitalizing machine; an extractor; a non-aqueous washing apparatus; and a revitalizing machine. The laundry treating appliance 10 described herein shares many features of a traditional automatic clothes dryer, which will not be described in detail except as necessary for a complete understanding of the invention.

The laundry treating appliance 10 may comprise a cabinet 12 having a controller 14 for controlling the operation of the laundry treating appliance 10 to complete a cycle of operation. A rotatable drum 28 may be located within the cabinet 12 defining a treating chamber 34 for receiving laundry to be treated during a cycle of operation.

Still referring to FIG. 1, an air flow system for the clothes dryer 10 according to one embodiment of the invention will now be described. As illustrated by arrows 40, the air flow system supplies air to the treating chamber 34 and then exhausts air from the treating chamber 34. The supplied air may be heated or not. The air flow system may have an inflow portion 41 that may be formed in part by an inlet conduit 42, which has one end open to the ambient air and another end fluidly coupled to an inlet channel 44, which may be in fluid communication with the treating chamber 34 through an air inlet 45. A heating element 46 may lie within the inlet conduit 42 and may be operably coupled to and controlled by the controller 14. If the heating element 46 is turned on, the supplied air will be heated prior to entering the drum 28. The inflow portion 41 may further include an inflow temperature sensor 48 to sense the temperature of the air supplied to the treating chamber 34. The inflow temperature sensor 48 may be located anywhere in the inflow portion 41 and may be operably coupled to the controller 14.

The air flow system may further include an outflow portion 51 that may be formed in part by an exhaust conduit 52 and exhaust channel 54, which are fluidly coupled by a blower 56. The blower 56 may be operably coupled to and controlled by the controller 14. Operation of the blower 56 draws air into the treating chamber 34 as well as exhausts air from the treating chamber 34 through the air outlet 59 to the outside of the laundry treating appliance 10 through the exhaust conduit 52. The outflow portion 51 may further include an outflow temperature sensor 58 to sense the temperature of the air exhausted from the treating chamber 34. The outflow temperature sensor 58 may be located anywhere in the outflow portion 51 and may be operably coupled to the controller 14.

The drum 28 may be rotated by any suitable drive mechanism, such as an indirect drive, which is illustrated as a motor 60 and a coupled belt 62. Some non-limiting examples of indirect drive are: three-phase induction motor drives, various types of single phase induction motors such as a permanent split capacitor (PSC), a shaded pole and a split-phase motor. Alternately, the motor 60 may be a direct drive motor, as is known in the art. Some non-limiting examples of an applicable direct drive motor are: a brushless permanent magnet (BPM or BLDC) motor, an induction motor, etc. The motor 60 may be operably coupled to the controller 14 to control the rotation of the drum 28 to complete a cycle of operation. The motor 60 may be operably coupled to the controller 14 to control the rotation of the drum 28 to complete a cycle of operation.

The clothes dryer 10 may optionally have a dispensing system 64 for dispensing treatment chemistries, including without limitation water or steam, individually or collectively into the treating chamber 34, and thus may be considered to be a dispensing dryer. The dispensing system 64 may include a dispenser 66 capable of holding and dispensing a treatment chemistry to the treating chamber 34 through a dispensing line 68. The dispenser 66 may be positioned to direct the treatment chemistry at the inner surface of the drum 28 so that laundry may contact and absorb the chemistry, or to dispense the chemistry directly onto the laundry in the treating chamber 34. The type of dispensing system 64 is not germane to the invention and may include additional components such as a chemistry meter to control the amount of treatment chemistry dispensed. Additionally or alternatively, the dispensing system 64 may include a steam generator for dispensing steam as a treatment chemistry into the treating chamber 34. The dispensing system 64 may be operably coupled with the controller 14 for dispensing a treatment chemistry during a course of operation.

The clothes dryer 10 may optionally also have an imaging system 70 to image the treating chamber 34 and/or anything within the treating chamber 34. The imaging system 70 may comprise one or more imaging devices and one or more illumination sources. Exemplary imaging devices may include any optical sensor capable of capturing still or moving images, such as a camera. One suitable type of camera is a CMOS camera. Other exemplary imaging devices include a CCD camera, a digital camera, a video camera or any other type of device capable of capturing an image. The camera may capture either or both visible and non-visible radiation. For example, the camera may capture an image using visible light. In another example, the camera may capture an image using non-visible light, such as ultraviolet light. In yet another example, the camera may be a thermal imaging device capable of detecting radiation in the infrared region of the electromagnetic spectrum. The imaging system 70 may be operably coupled with the controller 14 to capture one or more images of the treating chamber 34.

Figure 2:
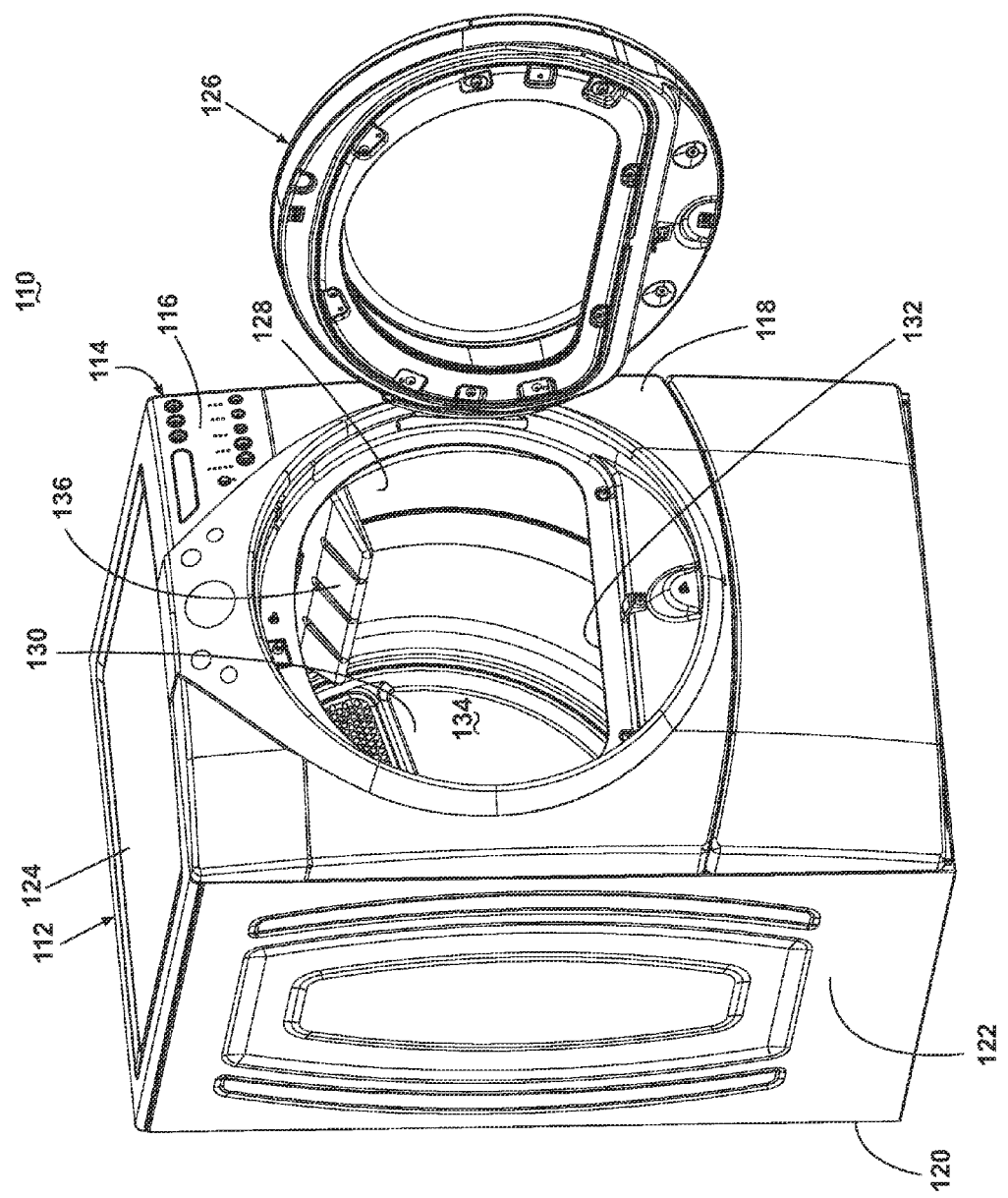
FIG. 2 is a front perspective view of a laundry treating appliance according to an embodiment of the invention.

FIG. 2 illustrates a second embodiment of the invention in the form of a clothes dryer 110 which is similar in structure to the laundry treating appliance 10. Therefore, elements in the clothes dryer 110 similar to the laundry treating appliance 10 will be numbered with the prefix 100. The clothes dryer 110 described herein shares many features of a traditional automatic clothes dryer which will not be described in detail except as necessary for a complete understanding of the invention.

The clothes dryer 110 may include a cabinet 112 in which is provided a controller 114 that may receive input from a user through a user interface 116 for selecting a cycle of operation and controlling the operation of the clothes dryer 110 to implement the selected cycle of operation.

The cabinet 112 may be defined by a front wall 118, a rear wall 120, and a pair of side walls 122 supporting a top wall 124. A door 126 may be hingedly mounted to the front wall 118 and may be selectively moveable between opened and closed positions to close an opening in the front wall 118, which provides access to the interior of the cabinet.

A rotatable drum 128 may be disposed within the interior of the cabinet 112 between opposing stationary rear and front bulkheads 130 and 132, which collectively define a treating chamber 134, for treating laundry, having an open face that may be selectively closed by the door 126. Non-limiting examples of laundry include, but are not limited to, a hat, a scarf, a glove, a sweater, a blouse, a shirt, a pair of shorts, a dress, a sock, a pair of pants, a shoe, an undergarment, and a jacket. Furthermore, textile fabrics in other products, such as draperies, sheets, towels, pillows, and stuffed fabric articles (e.g., toys), may be dried in the clothes dryer 110.

The drum 128 may include at least one lifter 136. In most dryers, there are multiple lifters. The lifters 136 may be located along the inner surface of the drum 128 defining an interior circumference of the drum 128. The lifters 136 may facilitate movement of the laundry within the drum 128 as the drum 128 rotates.

Figure 3:
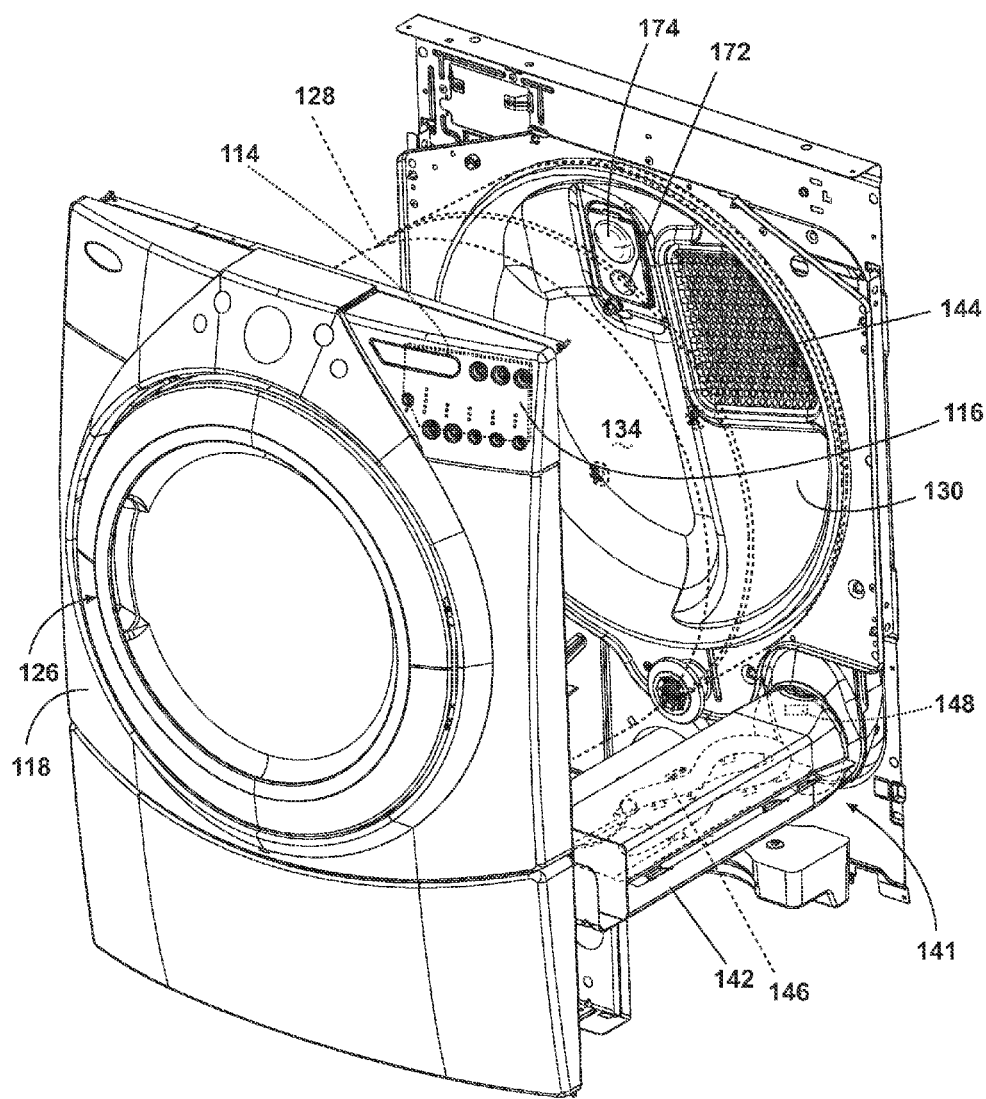
FIG. 3 is a partial perspective view of the laundry treating appliance of FIG. 2 with portions of the cabinet removed for clarity according to an embodiment of the invention.

Referring now to FIG. 3, an air flow system for the clothes dryer 110 according to one embodiment of the invention will now be described. The air flow system supplies air to the treating chamber 134 and then exhausts air from the treating chamber 134. The supplied air may be heated or not. The air flow system may have an inflow portion 141 that may be formed in part by an inlet conduit 142, which has one end open to the ambient air and another end fluidly coupled to an inlet grill 144, which may be in fluid communication with the treating chamber 134. A heating element 146 may lie within the inlet conduit 142 and may be operably coupled to and controlled by the controller 114. If the heating element 146 is turned on, the supplied air will be heated prior to entering the drum 128. The inflow portion 141 may further include an inflow temperature sensor 148 to sense the temperature of the air supplied to the treating chamber 134. The inflow temperature sensor 148 may be located anywhere in the inflow portion 141 to sense the temperature of the air flow before it enters the treating chamber 134 and may be operably coupled to the controller 114. The temperature sensor 148 may be any suitable type of temperature sensor such as a thermistor, thermocouple or RTD, for example.

Figure 4:
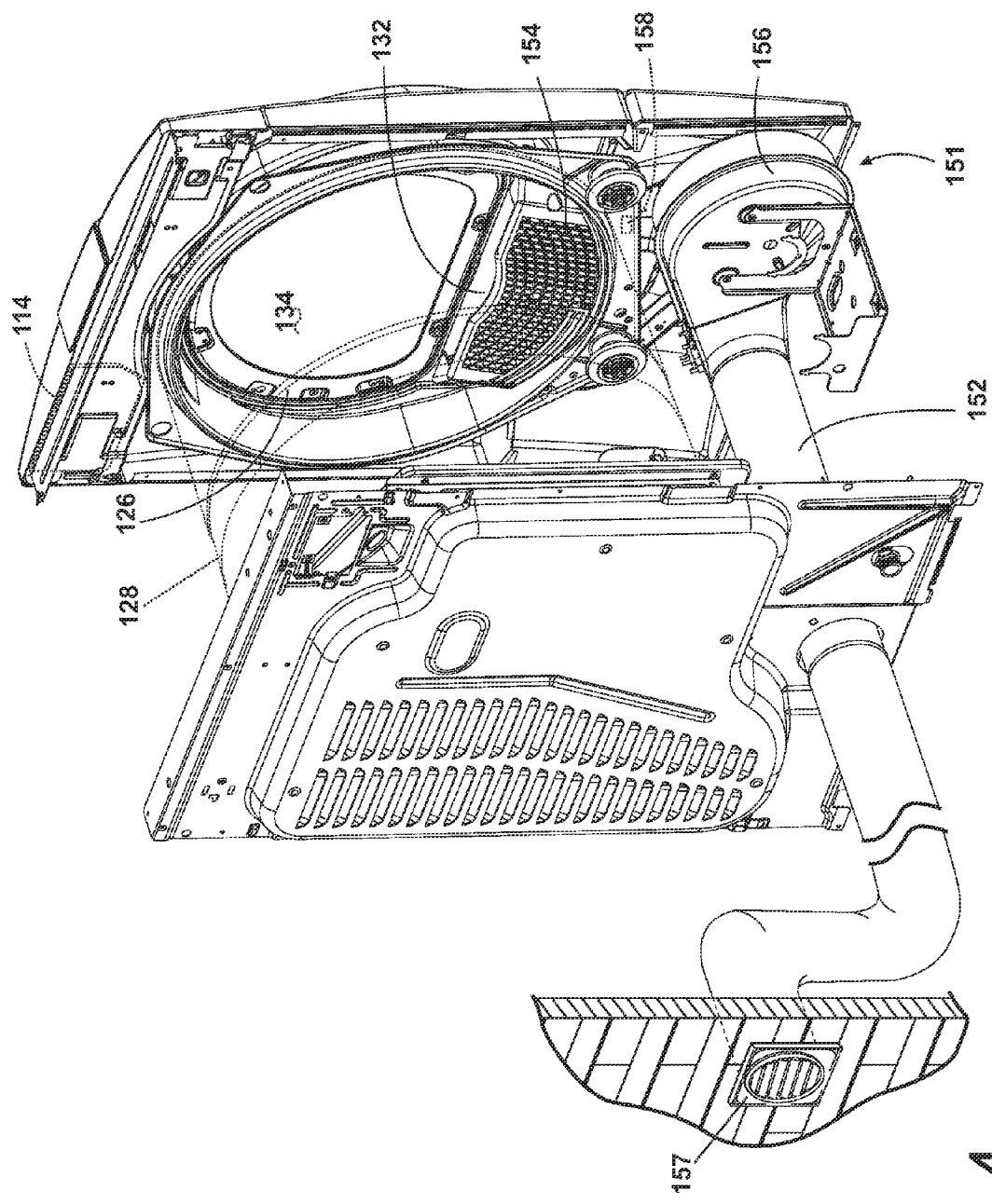
FIG. 4 is a second partial perspective view of the laundry treating appliance of FIG. 2 with portions of the cabinet removed for clarity according to an embodiment of the invention.

Referring to FIG. 4, the air flow system may further include an outflow portion 151 that may be formed in part by an exhaust conduit 152 and lint trap 154, which are fluidly coupled by a blower 156. The blower 156 may be operably coupled to and controlled by the controller 114. Operation of the blower 156 draws air into the treating chamber 134 as well as exhausts air from the treating chamber 134 through the exhaust conduit 152. The exhaust conduit 152 may be fluidly coupled with a household exhaust duct 157 for exhausting the air from the treating chamber 134 to the outside. The outflow portion 151 may further include an outflow temperature sensor 158 to sense the temperature of the air exhausted from the treating chamber 134. The outflow temperature sensor 158 may be located anywhere in the outflow portion 151 to sense the temperature of the air flow after it has been exhausted from the treating chamber 134 and may be operably coupled to the controller 114. The temperature sensor 158 may be any suitable type of temperature sensor such as a thermistor, thermocouple or RTD, for example.

Figure 5:
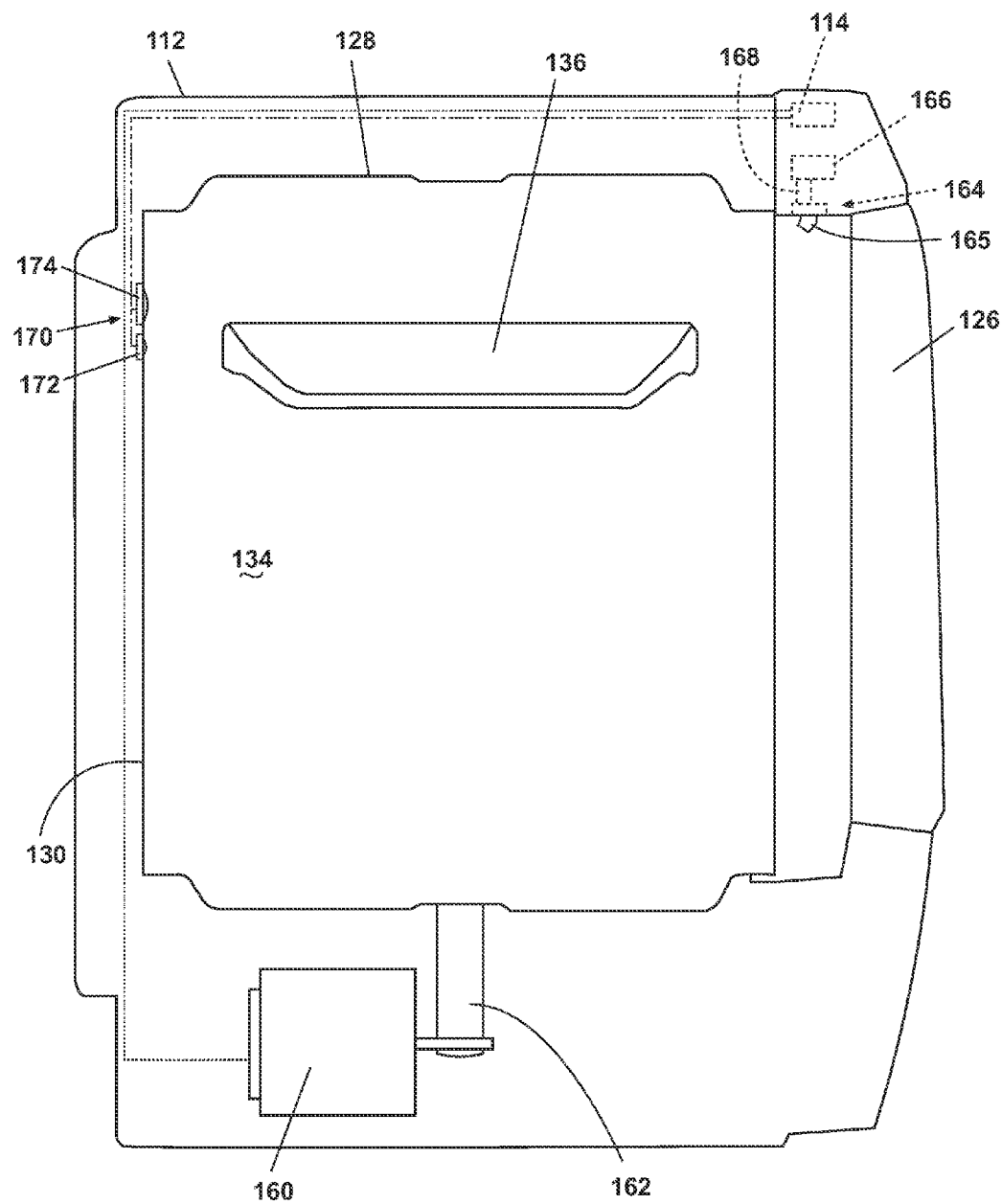
FIG. 5 is a schematic view of the laundry treating appliance of FIG. 2 according to an embodiment of the invention.

Referring now to FIG. 5, as is typical in a clothes dryer, the drum 128 may be rotated by a suitable drive mechanism, such as an indirect drive, which is illustrated as a motor 160 and a coupled belt 162. Some non-limiting examples of indirect drive are: three-phase induction motor drives, various types of single phase induction motors such as a permanent split capacitor (PSC), a shaded pole and a split-phase motor. Alternately, the motor 160 may be a direct drive motor, as is known in the art. Some non-limiting examples of an applicable direct drive motor are: a brushless permanent magnet (BPM or BLDC) motor, an induction motor, etc. The motor 160 may be operably coupled to the controller 114 to control the rotation of the drum 128 to complete a cycle of operation.

Still referring to FIG. 5, the clothes dryer 10 may optionally have a dispensing system 164 for dispensing treatment chemistries, including without limitation water or steam, into the treating chamber 134, and thus may be considered to be a dispensing dryer. The dispensing system 164 may include a dispenser 166 capable of holding and dispensing a treatment chemistry into the treating chamber 134. The dispenser 166 may be fluidly coupled with a nozzle 165 in fluid communication with the treating chamber 134 through a dispensing line 168. The nozzle 165 may be positioned to direct the treatment chemistry at the inner surface of the drum 128 so that laundry may contact and absorb the chemistry, or to dispense the chemistry directly onto the laundry in the treating chamber 134. The type of dispenser system 164 is not germane to the invention and may include additional components such as a chemistry meter to control the amount of treatment chemistry dispensed. Additionally or alternatively, the dispensing system 164 may include a steam generator for dispensing steam as a treatment chemistry into the treating chamber 134. The treatment chemistry may be in a form of gas, liquid, solid or any combination thereof and may have any chemical composition enabling improved wrinkle, odor, softness, whitening, brightening, addition of fragrance, or any other desired treatment of the laundry.

The clothes dryer 10 may also have an imaging system 170 comprising one or more imaging devices 172 and one or more illumination sources 174 to image the treating chamber 134 and/or anything within the treating chamber 134. The imaging system 170 may be similar to that which is described in Applicant's co-pending application bearing Applicant's reference number US20080156, titled "Laundry Treating Appliance with Load Surface Area Detection." Exemplary imaging devices 172 may include any optical sensor capable of capturing still or moving images, such as a camera. One suitable type of camera is a CMOS camera. Other exemplary imaging devices include a CCD camera, a digital camera, a video camera or any other type of device capable of capturing an image. The camera may capture either or both visible and non-visible radiation. For example, the camera may capture an image using visible light. In another example, the camera may capture an image using non-visible light, such as ultraviolet light. In yet another example, the camera may be a thermal imaging device capable of detecting radiation in the infrared region of the electromagnetic spectrum. The imaging device 172 may be located on either of the rear or front bulkhead 130, 132 or in the door 126. It may be readily understood that the location of the imaging device 172 may be in numerous other locations depending on the particular structure of the dryer and the desired position for obtaining an image. There may also be multiple imaging devices, which may image the same or different areas of the treating chamber 134.

The type of illumination source 174 may vary. In one configuration, the illumination source 174 may be a typical incandescent dryer light which is commonly used to illuminate the treating chamber 134. Alternatively, one or more LED lights may be used in place of an incandescent bulb. The illumination source 174 may also be located behind the rear bulkhead 130 of the drum 128 such that the light shines through the holes of the air inlet grill 144. It is also within the scope of the invention for the clothes dryer 110 to have more than one illumination source 174. For example, an array of LED lights may be placed at multiple positions in either bulkhead 130, 132.

Figure 6:
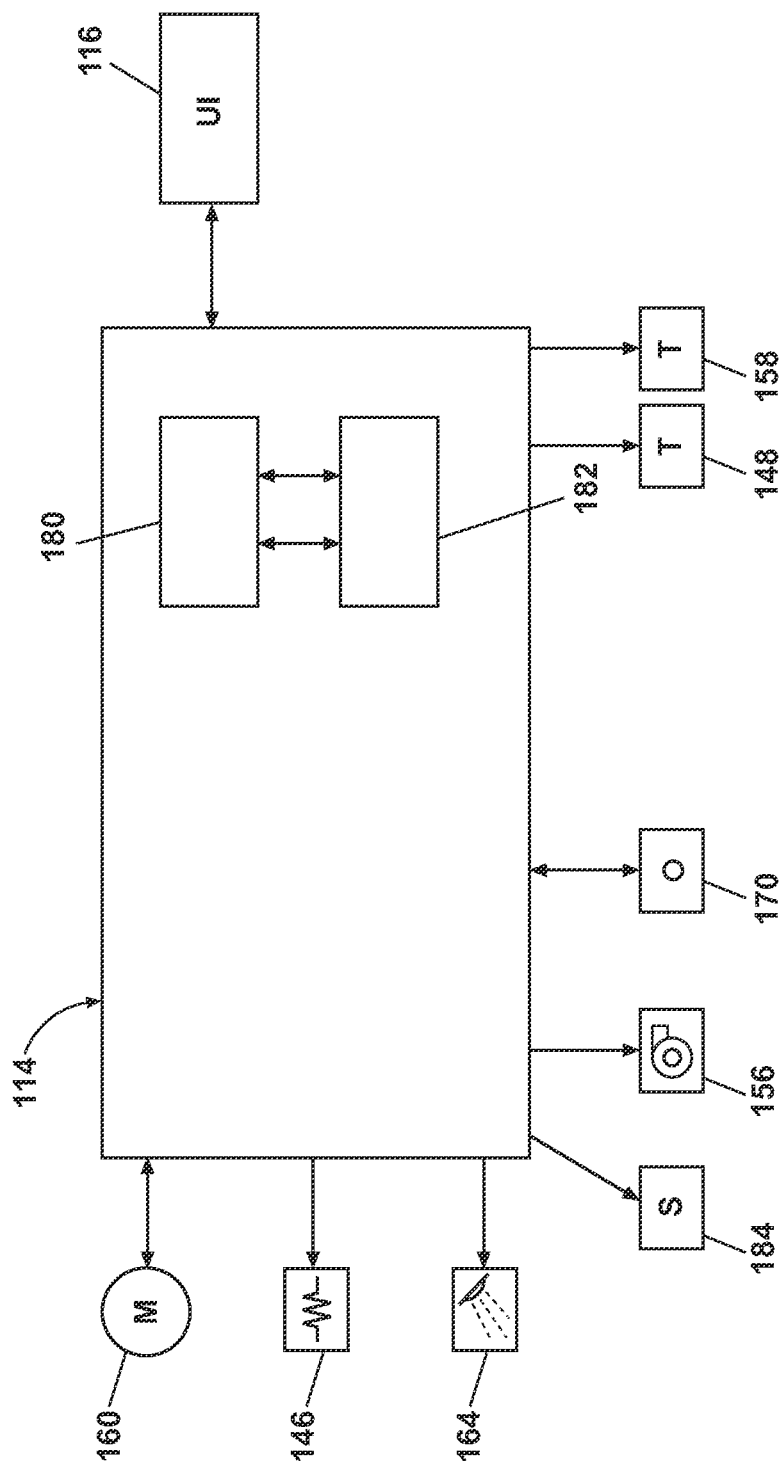
FIG. 6 is a schematic representation of a controller for controlling the operation of one or more components of the laundry treating appliance of FIG. 2 according to an embodiment of the invention.

As illustrated in FIG. 6, the controller 114 may be provided with a memory 180 and a central processing unit (CPU) 182. It is contemplated that the controller 114 is a microprocessor-based controller that implements control software stored in the memory 180 which may be internal to or in communication with the microprocessor. The memory 180 may comprise one or more software applications, and send/receive one or more electrical signals to/from each of the various working components to affect the control software. Examples of possible controllers are: proportional control (P), proportional integral control (PI), and proportional derivative control (PD), or a combination thereof, a proportional integral derivative control (PID control), which may be used to control the various components of the clothes dryer 110.

The controller 114 may be communicably and/or operably coupled with one or more components of the clothes dryer 110 for communicating with and controlling the operation of the component to complete a cycle of operation. For example, the controller 114 may be coupled with the heating element 146, the inflow temperature sensor 148, the outflow temperature 158 and the blower 156 for controlling the temperature and flow rate of air through the treating chamber 134; the motor 160 for controlling the direction and speed of rotation of the drum 128; the imaging system 170 for capturing one or more images of the treating chamber 134; and the dispensing system 164 for dispensing a treatment chemistry during a cycle of operation. The controller 114 may also be coupled with the user interface 116 for receiving user selected inputs and communicating information to the user.

The controller 114 may also receive input from various sensors 184, which are known in the art and not shown for simplicity. Non-limiting examples of sensors 184 that may be communicably coupled with the controller 114 include: a moisture sensor, an air flow rate sensor, a weight sensor, and a motor torque sensor.

The previously described laundry treating appliances 10 and 110 may be used to implement one or more embodiments of a method of the invention. Several embodiments of the method will now be described in terms of the operation of the clothes dryer 110. While the methods are described with respect to the clothes dryer 110, the methods may also be used with the laundry treating appliance 10 of the first embodiment of the invention. The embodiments of the method function to automatically determine the temperature of the laundry load within the treating chamber 134. The determined temperature of the laundry load may be used by the controller 114 to control the operation of the clothes dryer 110.

Controlling the operation of the clothes dryer 110 based on the determined temperature of the laundry load may include setting at least one parameter of a cycle of operation including a rotational speed of the drum 128, a direction of rotation of the drum 128, a temperature in the treating chamber 134, an air flow through the treating chamber 134, a type of treatment chemistry, an amount of treatment chemistry, a start or end of cycle condition and a start or end cycle step condition.

Setting a start or end of cycle condition may include determining when to start or end a cycle of operation. This may include signaling the controller 114 to immediately start or end a cycle of operation or setting a time at which to start or end a cycle of operation.

Setting a start or end of cycle step condition may include determining when to start a step or phase within a given operating cycle or when to end a step within a given operating cycle. This may include signaling the controller 114 to immediately transition from one cycle step to another or setting a time at which to transition from one step to another within a given operating cycle. Examples of cycle steps include rotation with heated air, rotation without heated air, treatment dispensing, a wrinkle guard step and cool down step.

Determining the temperature of the laundry load according to the present invention may be used to enable a variety of adaptive cycles having adaptive drying settings (for example, drying temperature), a better estimated end of cycle, improved energy savings and improved delivery of laundry care with less damage to the laundry fabric.

Figure 7:
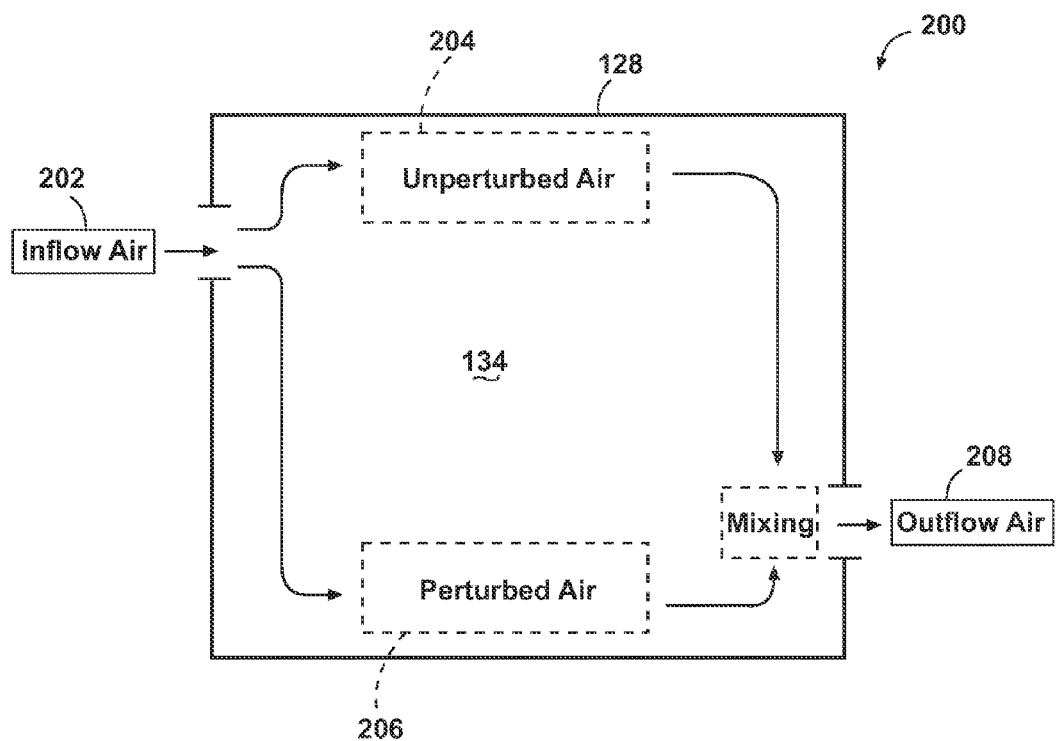
FIG. 7 is a schematic representation of air flow through a laundry treating appliance according to an embodiment of the invention.

The temperature of the laundry load may be estimated by considering the partition of the air flow through the air flow system of the clothes dryer 110 into two sub-flows of air as illustrated by a schematic representation 200 of the air flow system in FIG. 7. The schematic representation 200 is a conceptual illustration of the air flow system for the purposes of illustration only and is not meant to limit the invention in any manner. The inflow air 202 may enter the treating chamber 134 and separate into two sub-flows of air, an unperturbed air flow 204 and a perturbed air flow 206. The undisturbed or unperturbed air flow 204 is the portion of the inflow air 202 that flows through the treating chamber 134 with no interaction with the laundry load. The perturbed air flow 206 is the portion of the inflow air 202 that interacts with the laundry load in the treating chamber 134. The two sub-flows, the unperturbed air 204 and the perturbed air 206 mix as they are exhausted from the treating chamber 134 to form the outflow air 208.

For convenience of illustration, the perturbed and unperturbed air flows 206, 204 are illustrated with single discrete arrows. In reality, because the laundry is moving within the treatment chamber, there will be many different perturbed and unperturbed air flows, each of which could be illustrated with their own arrows. The arrows 206, 204 are meant to conceptually simplify the illustration and explanation and are not meant to indicate the exact physical location and volume of each of the perturbed and unperturbed air flows.

The unperturbed air 204 does not interact with the laundry load and therefore the thermodynamic state of the unperturbed air 204 does not change as it flows through the treating chamber 134. The perturbed air 206 interacts with the fabric of the laundry load, exchanging mass and energy, and thus its thermodynamic state changes. The partitioning of the inflow air 202 into the unperturbed air flow 204 and the perturbed air flow 206 is a function of the amount of the laundry load. The load amount may be a quantitative amount, non-limiting examples of which include the weight, mass, volume, density and area of the laundry load.

For example, as the mass of the load increases, the proportion of the perturbed air 206 in the outflow air 208 increases as the proportion of the unperturbed air 204 decreases. In another example, the surface area of the load may be used to determine the partition of the inflow air 202. Laundry loads having a larger surface area have more surface area to interact with the inflow air 202 than laundry loads having a smaller surface area. In yet another example, the partitioning of the inflow air 202 may be determined based on the volume of the chamber occupied by the laundry load. Laundry loads having a larger volume may interact more with the inflow air 202 than laundry loads having a smaller volume because there is less space for the inflow air 202 to pass unperturbed through the treating chamber 134 than when a small load is present in the treating chamber 134.

Because the thermodynamic state of the unperturbed air 204 does not change as it passes through the treating chamber 134, the temperature of the inflow air 202 is indicative of the temperature of the unperturbed air 204. The perturbed air 206 interacts with the laundry load and therefore the thermodynamic state of the perturbed air 206 is indicative of the temperature of the laundry load. As a result of the mixing of the unperturbed air 204 and the perturbed air 206 as the air is exhausted from the treating chamber 134, the temperature of the outflow air 208 is a function of the temperature of the unperturbed air 204, the perturbed air 206 and the amount of the laundry load, which determines the partitioning of the inflow air 202. Because the temperature of the perturbed air 206 is representative of the temperature of the laundry load, the temperature of the laundry load may be estimated as illustrated in equation (1).

$$T_{load} = f(T_{inflow\ air}, T_{outflow\ air}, \text{Load Amount}) \quad (1)$$

$T_{load}$ represents the temperature of the laundry load and Load Amount represents the amount of the load. $T_{inflow\ air}$ is representative of the temperature of the inflow air 202 being supplied to the treating chamber 134 and may be determined using the inflow temperature sensor 148. $T_{outflow\ air}$ represents the temperature of the outflow air 208 being exhausted from the treating chamber 134 and may be determined using the outflow temperature sensor 158.

One example of an algorithm that may be used to determine the temperature of the load $T_{load}$ may be based on considering the moist air enthalpy and the dry air mass flow rate of the inflow air 202, the perturbed air 206 and the outflow air 208 using a simple model of the actual process. The dry air mass flow rate of the inflow air 202 may be assumed to be equal to the sum of the unperturbed air 204 and the perturbed air 206 dry air mass flow rates. The moist air enthalpy may be represented by equations (2)-(4) where $h_{inflow}$, $h_{perturbed}$ and $h_{outflow}$ represents the moist air enthalpy of the inflow air 202, the perturbed air 206 and the outflow air 208, respectively. $X_{inflow}$, $X_{perturbed}$ and $X_{outflow}$ represent the humidity ratio of the inflow air 202, the perturbed air 206 and the outflow air 208, respectively. $k_1$, $k_2$ and $k_3$ are thermodynamic constants.

$$h_{inflow} = k_3 T_{inflow} + (k_1 + k_2 * T_{inflow}) * X_{inflow} \quad (2)$$

$$h_{perturbed} = k_3 * T_{perturbed} + (k_1 + k_2 * T_{perturbed}) * X_{perturbed} \quad (3)$$

$$h_{outflow} = k_3 * T_{outflow} + (k_1 + k_2 * T_{outflow}) * X_{outflow} \quad (4)$$

The dry air mass flow rate may be represented by the following equation (5) where $\dot{m}_{dry\_air}$ represents the dry air mass flow rate of the outflow air 208, $\dot{m}_{dry\_air} * \phi$ represents the dry air mass flow rate of the perturbed air 206 and $\dot{m}_{dry\_air} * (1-\phi)$ represents the dry air mass flow rate of the inflow air 202 passing unperturbed through the treating chamber 134 and where $\phi$ equals the Load Amount multiplied by a first calibration constant plus a second calibration constant.

$$\dot{m}_{dry\_air} * X_{outflow} = \dot{m}_{dry\_air}) * (1-\phi) * X_{inflow} + \dot{m}_{dry\_air} * \phi * X_{perturbed} \quad (5)$$

It may be assumed with inconsequential error that the evaporation process at each temporal instant is at constant enthalpy so that $h_{inflow} = h_{perturbed} = h_{outflow}$. As described above, the perturbed air 206 interacts with the laundry load and therefore the temperature of the perturbed air 206 is indicative of the temperature of the laundry load. Therefore, it may be assumed with inconsequential error that $T_{perturbed} = T_{load}$. Equations (2)-(5) may then be solved to provide the following algorithm for determining the temperature of the laundry load (6):

$$T_{load} = (T_{inflow} * \phi * k_1 + T_{inflow} * T_{outflow} * \phi * k_2 - k_1 * T_{inflow} + k_1 * T_{outflow}) / (* k_1 + \phi * k_2 * T_{outflow} + k_2 * T_{inflow} - k_2 * T_{outflow}) \quad (6)$$

The moist air enthalpy h and the humidity ratio X are parameters that are not easily directly measurable. By making the assumption that $k_{inflow} = h_{perturbed} = h_{outflow}$, equations 2-5 may be solved to determine $T_{perturbed}$ using parameters that may be directly measured, such as the inflow and outflow temperatures, $T_{inflow}$ and $T_{outflow}$. Based on the assumption that $T_{perturbed} = T_{load}$, equation (6) may then be solved for $T_{load}$ as illustrated above.

Figure 8:
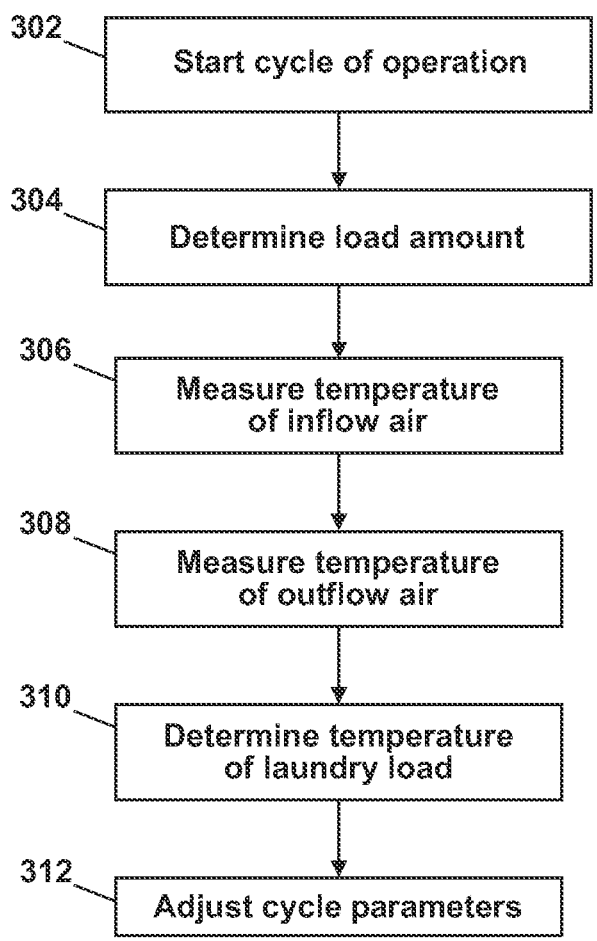
FIG. 8 is a flow chart illustrating a method for estimating the temperature of a laundry load in a laundry treating appliance according to an embodiment of the invention.

Referring to FIG. 8, a flow chart of one method 300 of estimating the temperature of the laundry load is shown in accordance with the present invention. The laundry load temperature estimation method 300 may be executed by the controller 114 during a drying or treatment cycle of the clothes dryer 110. The sequence of steps depicted is for illustrative purposes only, and is not meant to limit the fabric temperature estimation method 300 in any way as it is understood that the steps may proceed in a different logical order or additional or intervening steps may be included without detracting from the invention. While the method 300 is described in the context of the clothes dryer 110, it is understood that method 300 may also be used with the laundry treating appliance 10.

The method 300 starts with assuming that the user has loaded the clothes dryer 110 with one or more articles to form the laundry load and closed the door 126. The method 300 may be initiated at the start of a user selected operating cycle or at some predetermined time after the start of the user selected operating cycle at 302.

At 304, the amount of the laundry load may be determined. The determination of the load at 304 may be part of the treatment cycle or it may be a separate cycle completed prior to the start of the treatment cycle. Determining the amount of the laundry load may include determining the mass, weight, volume, packing density and area of the laundry load and may be done in any suitable manner. For example, the load amount determination may be provided by a user via user interface 116 or via data indicative of the load amount received from one or more sensors related to the motor 160, the drum 128 or any other components of the clothes dryer 110. In another example, the drum 128 may be rotated to acquire one or more motor characteristics which may be used to derive the amount of the load. The characteristic of the motor 160 may be any data related to the operation of the motor 160, such as motor torque, motor speed, motor current and motor voltage.

The load amount may also be determined based on the readings from one or more temperature sensors. One method for determining the load amount is set forth in Applicant's co-pending application bearing Applicant's reference number US20090295, titled "Method for Determining Load Size in a Clothes Dryer Using an Infrared Sensor." An infrared temperature sensor may be used to obtain multiple temperature readings inside a treating chamber of a clothes dryer. The variation in the temperature readings may be used to determine the load amount.

In another example, the amount of the load may be determined based on the surface area of the load. The surface area of the load may be determined using any suitable method. One method for determining the surface area of the load is set forth in Applicant's co-pending application bearing Applicant's reference number US20080156, titled "Laundry Treating Appliance with Load Surface Area Detection." According to the load surface area method of US20080156, an imaging device may be used to capture one or more images of a treating chamber. The captured images may be sent to a controller for analysis using software associated with the controller to determine the surface area of the load within the treating chamber. According to the current method, the determined surface area may then be used to determine the partitioning of the inflow air as described above which may then be used to estimate the temperature of the fabric load at 310.

In another example, the amount of the load may be determined based on the packing density of the load. The packing density of the load may be determined using any suitable method. One method for determining the packing density of the load is set forth in Applicant's co-pending application bearing Applicant's reference number US20080165, titled "Laundry Treating Appliance with Tumble Pattern Control." The method according US20080165 converts the motor torque signal while the drum is rotating from the time domain to the frequency domain in order to estimate the packing density. The packing density may be characterized in terms of the free space within the treating chamber not occupied by the load, the ratio of the volume of the laundry load to the total volume of the treating chamber or the ratio of the free volume of the treating chamber to the total volume of the treating chamber. According to the current method, the determined volume of either the laundry load or the free volume of the treating chamber may then be used to determine the partitioning of the inflow air as described above which may then be used to estimate the temperature of the fabric load at 310.

At 306 and 308 the temperature of the inflow air and outflow air may be measured by the inflow temperature sensor 148 and the outflow temperature sensor 158, respectively, and sent to the controller 114 for analysis using software that is stored in the memory 180 of the controller 114.

At 310 the load amount determined at 304 and the inflow and outflow air temperatures measured at 306 and 308, respectively, may be used by software stored in the memory 180 of the controller 114 to determine the temperature of the laundry load. For example, the load amount and inflow and outflow air temperatures may be used to solve the algorithm of equation (6) to determine the temperature of the load.

At 312 the cycle parameters may be adjusted based on the laundry load temperature determined at 310. The determined fabric temperature may be used by the controller 114 to set one or more parameters of a cycle of operation including a rotational speed of the drum 128, a direction of rotation of the drum 128, a temperature in the treating chamber 134, an air flow through the treating chamber 134, a type of treatment chemistry, an amount of treatment chemistry, a start or end of cycle condition and a start or end cycle step condition.

The method 300 may be completed once during the course of a cycle of operation. Alternatively, elements 304-312 or 306-312 of the method 300 may be repeated a plurality of times during a cycle of operation to determine the temperature of the laundry load and adjust the cycle parameters at multiple times throughout the cycle of operation.

The method 300 provides a real-time estimate of the temperature of the laundry load and may be used to increase energy and time efficiency by maximizing the removal of water during the drying process while minimizing the energy provided to the system. By monitoring the temperature of the laundry load during the course of an operating cycle, one or more cycle parameters may be adjusted to achieve a desired dryness level without over drying or over heating the laundry load. Avoiding over drying and over heating of the laundry load saves time and energy and also minimizes damage to the laundry load. In addition, by taking into account the amount of the load, the estimation of the temperature of the laundry load may be more accurate over a larger range of load amounts. This may be particularly advantageous for small laundry loads which may quickly become over dried and/or over heated.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims. For example, the sequence of steps depicted in each method described herein is for illustrative purposes only, and is not meant to limit the disclosed methods in any way as it is understood that the steps may proceed in a different logical order or additional or intervening steps may be included without detracting from the invention.

What is claimed is:

1. A laundry dryer comprising:
a rotatable drum defining a treating chamber for receiving a laundry load for drying and having an air inlet and an air outlet;
an air flow system having an inflow portion fluidly coupled with the treating chamber at the air inlet to provide inflow air to the treating chamber and an outflow portion fluidly coupled with the treating chamber through the air outlet to exhaust outflow air from the treating chamber;
a heating system thermally coupled with the inflow portion and operable to heat the inflow air;
an inflow temperature sensor operable to provide an inflow temperature output indicative of the temperature of the inflow air;
an outflow temperature sensor operable to provide an outflow temperature output indicative of the temperature of the outflow air;
a load sensor operable to provide a load size output indicative of the size of the laundry load in the treating chamber; and
a controller coupled with the inflow temperature sensor, the outflow temperature sensor, and the load sensor, the controller having a laundry temperature estimation algorithm and operable to receive the inflow temperature output, the outflow temperature output, and the load size output, respectively, wherein the controller applies the inflow temperature output, outflow temperature output, and the load size output as input parameters to the laundry temperature estimation algorithm and provides a laundry temperature output indicative of the temperature of the laundry load.

2. The laundry dryer of claim 1 wherein the inflow portion comprises an inlet conduit coupled with the air inlet and the outflow portion comprises an outlet conduit coupled with the air outlet, and wherein the inflow temperature sensor is located in one of the inlet conduit and the air inlet, and the outflow temperature sensor is located in one of the outlet conduit and the air outlet.

3. The laundry dryer of claim 1 wherein the laundry temperature estimation algorithm applies the inflow temperature output, outflow temperature output, and load size output to determine an air flow temperature of an air flow of perturbed air passing through the treating chamber and contacting the laundry load, which is used to determine the temperature of the laundry load.

4. The laundry dryer of claim 3 wherein the laundry temperature estimation algorithm relates the determined air flow temperature of the perturbed air with an actual temperature of the laundry load to determine the temperature of the laundry load.

5. The laundry dryer of claim 1 wherein the controller uses the laundry temperature output to control at least one of a drying cycle and a phase of a drying cycle.

6. The laundry dryer of claim 5 wherein the controller uses the laundry temperature output to terminate at least one of the at least one drying cycle and drying phase.

7. The laundry dryer of claim 1 wherein the controller uses the laundry temperature output to control an amount of heat generated by the heating system.

8. The laundry dryer of claim 1 wherein the controller uses the laundry temperature output to terminate a drying phase and initiate a cool down phase.

* * * * *